United States Patent
Yamaguchi et al.

(10) Patent No.: US 9,460,532 B2
(45) Date of Patent: Oct. 4, 2016

(54) IMAGING DEVICE, IMAGE SIGNAL PROCESSING METHOD, AND PROGRAM

(71) Applicant: Sony Corporation, Tokyo (JP)

(72) Inventors: Kazunori Yamaguchi, Kanagawa (JP); Katsuhisa Shinmei, Kanagawa (JP)

(73) Assignee: SONY CORPORATION, Tokyo (JP)

(*) Notice: Subject to any disclaimer, the term of this patent is extended or adjusted under 35 U.S.C. 154(b) by 419 days.

(21) Appl. No.: 13/953,214

(22) Filed: Jul. 29, 2013

(65) Prior Publication Data

US 2014/0044366 A1    Feb. 13, 2014

(30) Foreign Application Priority Data

Aug. 10, 2012   (JP) .................................. 2012-178010

(51) Int. Cl.
| | |
|---|---|
| *G06K 9/40* | (2006.01) |
| *G06T 11/60* | (2006.01) |
| *G06T 5/00* | (2006.01) |
| *G06T 5/50* | (2006.01) |
| *H04N 5/20* | (2006.01) |
| *H04N 5/21* | (2006.01) |
| *H04N 5/217* | (2011.01) |
| *H04N 5/235* | (2006.01) |

(52) U.S. Cl.
CPC ............. *G06T 11/60* (2013.01); *G06T 5/002* (2013.01); *G06T 5/009* (2013.01); *G06T 5/50* (2013.01); *H04N 5/20* (2013.01); *H04N 5/21* (2013.01); *H04N 5/217* (2013.01); *H04N 5/2355* (2013.01); *G06T 2207/10016* (2013.01); *G06T 2207/10144* (2013.01); *G06T 2207/20221* (2013.01)

(58) Field of Classification Search
CPC .......... G06T 2207/10144; G06T 2207/20208; G06T 2207/20221; G06T 5/50
See application file for complete search history.

(56) References Cited

U.S. PATENT DOCUMENTS

| | | | | |
|---|---|---|---|---|
| 2003/0118238 | A1* | 6/2003 | Martinez-Uriegas | G06T 9/00 382/232 |
| 2004/0136603 | A1* | 7/2004 | Vitsnudel | G06T 5/004 382/254 |
| 2008/0219585 | A1* | 9/2008 | Kasai | H04N 5/2351 382/274 |
| 2009/0046947 | A1* | 2/2009 | Kobayashi | G06T 5/50 382/284 |
| 2010/0157078 | A1* | 6/2010 | Atanassov | G06T 5/007 348/222.1 |
| 2010/0271512 | A1* | 10/2010 | Garten | G09G 5/06 348/239 |
| 2011/0188744 | A1* | 8/2011 | Sun | G06T 5/50 382/162 |
| 2011/0254976 | A1* | 10/2011 | Garten | G06F 3/1454 348/229.1 |

(Continued)

FOREIGN PATENT DOCUMENTS

| | | |
|---|---|---|
| JP | 2008-160881 | 7/2008 |
| JP | 2010-041200 | 2/2010 |

*Primary Examiner* — Stephen R Koziol
*Assistant Examiner* — Jonathan S Lee
(74) *Attorney, Agent, or Firm* — Chip Law Group

(57) ABSTRACT

There is provided an imaging device including a recorded image signal exposure information corrector that, on the basis of information related to different exposure times, corrects a recorded image signal recorded with the different exposure times, a mixing coefficient calculator that calculates a mixing coefficient used for mixing the corrected recorded image signal with a mixed image signal, in which recorded image signals recorded with the different exposure times are mixed, retrieved from a storage unit that saves the mixed image signal, and a mixer that outputs the mixed image signal in which the mixed image signal retrieved from the storage unit and the corrected recorded image signal are mixed on the basis of the mixing coefficients, and writes the mixed image signal to the storage unit.

12 Claims, 4 Drawing Sheets

(56) References Cited

U.S. PATENT DOCUMENTS

| | | | | |
|---|---|---|---|---|
| 2012/0008008 A1* | 1/2012 | Nakabayashi | H04N 5/23219 | 348/223.1 |
| 2012/0183210 A1* | 7/2012 | Zheng | G06T 5/009 | 382/162 |
| 2012/0301048 A1* | 11/2012 | Wakazono | G06T 5/50 | 382/264 |
| 2013/0051700 A1* | 2/2013 | Jo | H04N 5/23254 | 382/284 |
| 2013/0286246 A1* | 10/2013 | Matsuoka | G06T 5/007 | 348/229.1 |
| 2013/0308012 A1* | 11/2013 | Fukutomi | H04N 1/407 | 348/229.1 |
| 2014/0321766 A1* | 10/2014 | Jo | H04N 5/23254 | 382/255 |

* cited by examiner

IMAGING DEVICE, IMAGE SIGNAL PROCESSING METHOD, AND PROGRAM

BACKGROUND

The present disclosure relates to an imaging device, an image signal processing method, and a program that conduct a dynamic range extension process and a noise removal process, for example.

In an imaging device of the related art, a dynamic range extension process and a noise removal process are each conducted separately. Herein, a dynamic range extension process refers to a process that extends the dynamic range of a recorded image signal by mixing recorded image signals corresponding to the images of multiple frames recorded with different exposure times. Meanwhile, a noise removal process refers to a process that removes noise imposed onto respective images by mixing recorded image signals recorded consecutively in the time direction.

Japanese Unexamined Patent Application Publication No. 2010-41200 discloses an example of conducting a dynamic range extension process by conducting a mixing process on image signals corresponding to the images of two frames recorded with different exposure times. With this process, a noise removal process is conducted by using a frame recursion quantity, which depends on motion determination results and exposure times, to conduct a mixing process and a blending process on the mixed image signal of the previous frame and the mixed image signal of the current frame.

Japanese Unexamined Patent Application Publication No. 2008-160881 discloses technology that uses timewise consecutive image signals with the same exposure times with respect to image signals corresponding to the images of multiple frames recorded with the same or different exposure times. Noise is then removed from the image signals by conducting a finite impulse response (FIR) process. Furthermore, dynamic range extension is conducted by mixing image signals with different exposure times and with noise removed. Japanese Unexamined Patent Application Publication No. 2008-160881 discusses FIR. However, it is also conceivable to conduct image mixing in order to extend dynamic range after conducting an infinite impulse response (IIR) process on each timewise consecutive exposure time.

SUMMARY

With the technology described in Japanese Unexamined Patent Application Publication No. 2010-41200 and Japanese Unexamined Patent Application Publication No. 2008-160881, a dynamic range extension process and a noise removal process are conducted separately, and thus noise may be imposed onto a mixed image signal, lowering the quality of the mixed image signal.

In light of such circumstances, it is desirable to raise the quality of a mixed image signal that is a mixture of multiple recorded image signals with different exposure times.

According to an embodiment of the present disclosure, a recorded image signal is corrected on the basis of information related to the different exposure times of recorded image signals recorded with different exposure times.

Next, there is a calculated mixing coefficient for mixing a recorded image signal combined with information related to the exposure time with a mixed image signal retrieved from a storage unit that saves a mixed image signal mixing recorded image signals recorded with different exposure times.

Next, there is output a mixed image signal that mixes, on the basis of the mixing coefficients, the mixed image signal retrieved from the storage unit, and a recorded image signal combined with a ratio of exposure times.

The mixed image signal is then written to the storage unit.

In so doing, mixing a mixed image signal with a recorded image signal on the basis of mixing coefficients yields a mixed image signal in which noise is removed from the recorded image signal, and in which the dynamic range of the recorded image signal is extended.

According to an embodiment of the present disclosure, information related to the exposure times of recorded image signals recorded with different exposure times is used together with mixing coefficients computed on the basis of the recorded image signals and a mixed image signal, and a mixed image signal with increased quality may be output.

DETAILED DESCRIPTION OF THE EMBODIMENT(S)

Figure 1:
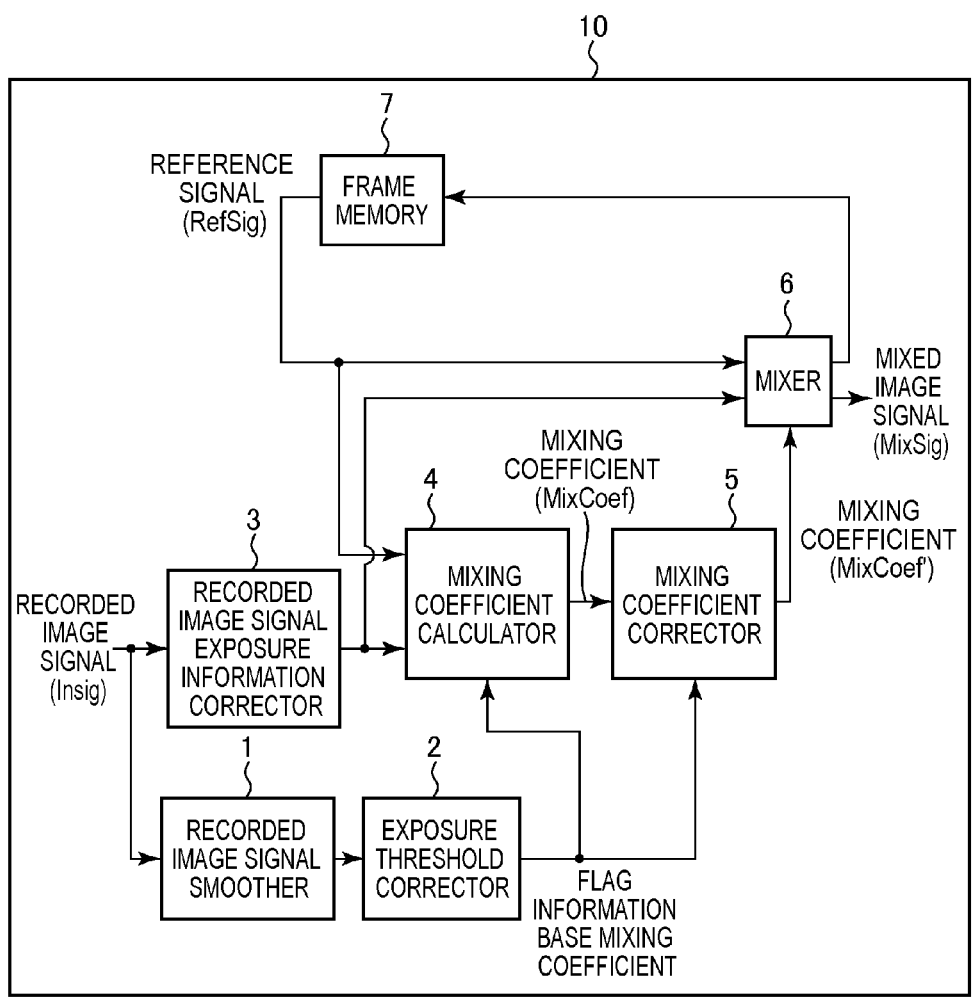
FIG. 1 is a block diagram illustrating an exemplary internal configuration of an imaging device according to a first exemplary embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments for carrying out the present disclosure (hereinafter designated the exemplary embodiments) will be described. The description will proceed in the following order. Note that like reference signs are given to shared parts, and detailed description thereof will be reduced or omitted.

1. Preliminary explanation
2. First exemplary embodiment (example of conducting a dynamic range extension process and a noise removal process)
3. Second exemplary embodiment (example of accommodating large luminance changes across frames)
4. Third exemplary embodiment (example of reducing bus bandwidth and frame memory capacity)
5. Exemplary modifications

1. Preliminary Explanation

The Inventors first conducted the following investigation.

Figure 6:
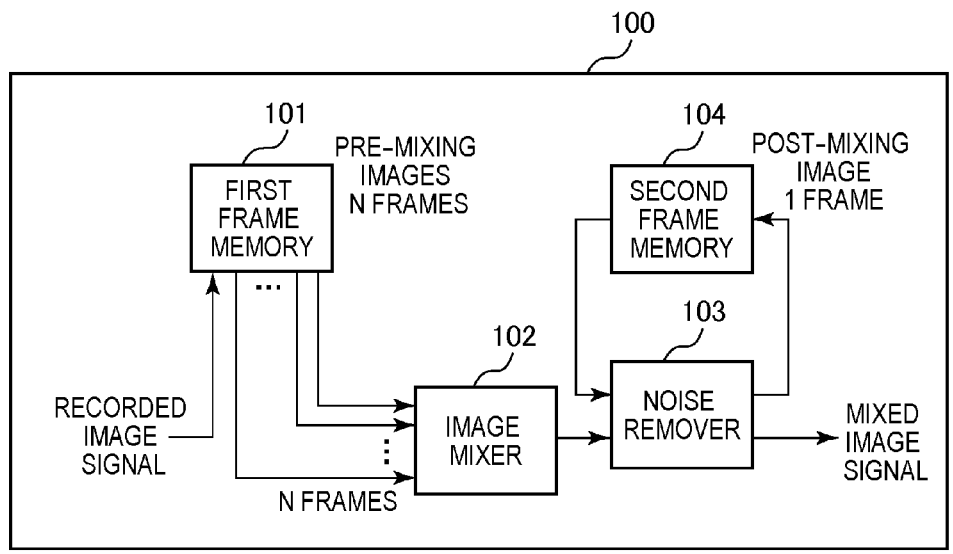
FIG. 6 is a block diagram illustrating an exemplary internal configuration of an image processing device.

FIG. 6 is a block diagram illustrating an exemplary internal configuration of an image processing device 100.

The image processing device 100 is equipped with first frame memory 101, an image mixer 102, a noise remover 103, and second frame memory 104. The image processing device 100 conducts a noise removal process on an image that has been subjected to a dynamic range extension process.

An image sensor (not illustrated) takes images of a subject at a first exposure time (long exposure) and a second exposure time (short exposure) that is shorter than the first exposure time, and individually outputs recorded image signals exposed with the respective exposure times. The first frame memory 101 then saves the recorded image signals input from the image sensor (not illustrated) as pre-mixing images over multiple frames (N frames, for example). The image mixer 102 retrieves the N frames of pre-mixing images from the first frame memory 101, and mixes these N frames of pre-mixing images. During this mixing, recorded image signals exposed at the long exposure are mixed together, recorded image signals exposed at the short exposure are mixed together, and a post-mixing image is generated. The image mixer 102 then outputs the post-mixing image as a mixed image with extended dynamic range. The noise remover 103 saves a post-mixing image input from the image mixer 102 into the second frame memory 104. The noise remover 103 then uses the post-mixing image of the last frame retrieved from the second frame memory 104 to remove noise from the post-mixing image of the current frame input from the image mixer 102, and outputs a mixed image signal.

However, the image processing device 100 includes at least two high-capacity frame memories: one for image mixing in order to extend the dynamic range, and another for frame recursion in order to conduct a noise removal process. Furthermore, the above involves each frame memory separately conducting processing to compute motion information and align images, thus increasing the circuit size and power consumption.

Figure 7:
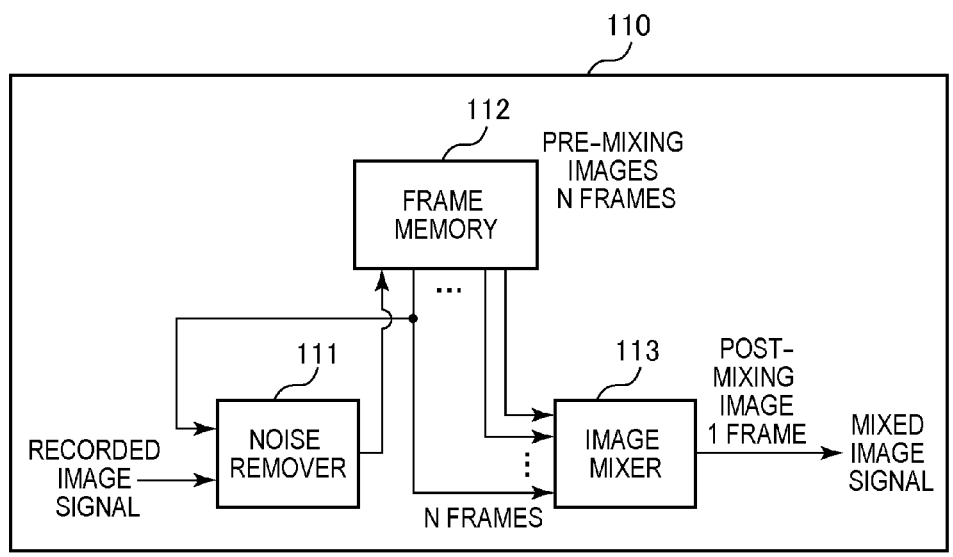
FIG. 7 is a block diagram illustrating an exemplary internal configuration of an image processing device.

FIG. 7 is a block diagram illustrating an exemplary internal configuration of an image processing device 110.

The image processing device 110 is equipped with a noise remover 111, frame memory 112, and an image mixer 113. The image processing device 110 conducts a dynamic range extension process using recorded image signals in which noise has been removed from recorded image signals generated with different exposure times.

The noise remover 111 removes noise from recorded image signals input from the image sensor (not illustrated) described with FIG. 6 according to the respective characteristics of the long exposure and the short exposure, and saves the resulting recorded image signals to the frame memory 112 over multiple frames as pre-mixing images. The noise remover 111 conducts a process that removes noise from the recorded image signal of the pre-mixing image of the previous frame retrieved from the frame memory 112. The image mixer 113 retrieves the recorded image signals for N frames of pre-mixing images from the frame memory 112, mixes these N frames of pre-mixing images, and outputs a recorded image signal of a post-mixing image with extended dynamic range.

The image processing device 110 conducts image mixing for dynamic range extension after conducting a noise removal process on each recorded image signal recorded with different exposure times. However, differences in the S/N ratio produced when mixing recorded image signals with different exposure times, shot noise produced by electronic circuits, and noise in mixed regions due to saturation levels are not removed, making the boundaries of mixed regions noticeable.

As a result of the above investigation, the Inventors discovered the configuration and processing of an imaging device 10 according to the first exemplary embodiment of the present disclosure. A description of how the mixed image signal quality is increased when simultaneously conducting a dynamic range extension process and a noise removal process will now be described.

2. First Exemplary Embodiment

Figure 2:
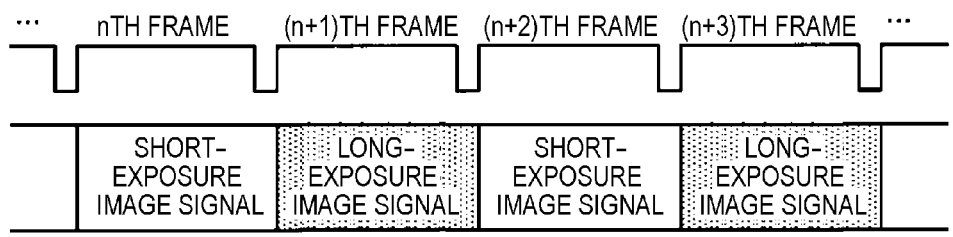
FIG. 2 is an explanatory diagram illustrating an example of a recorded image signal according to a first exemplary embodiment of the present disclosure.
Figure 3:
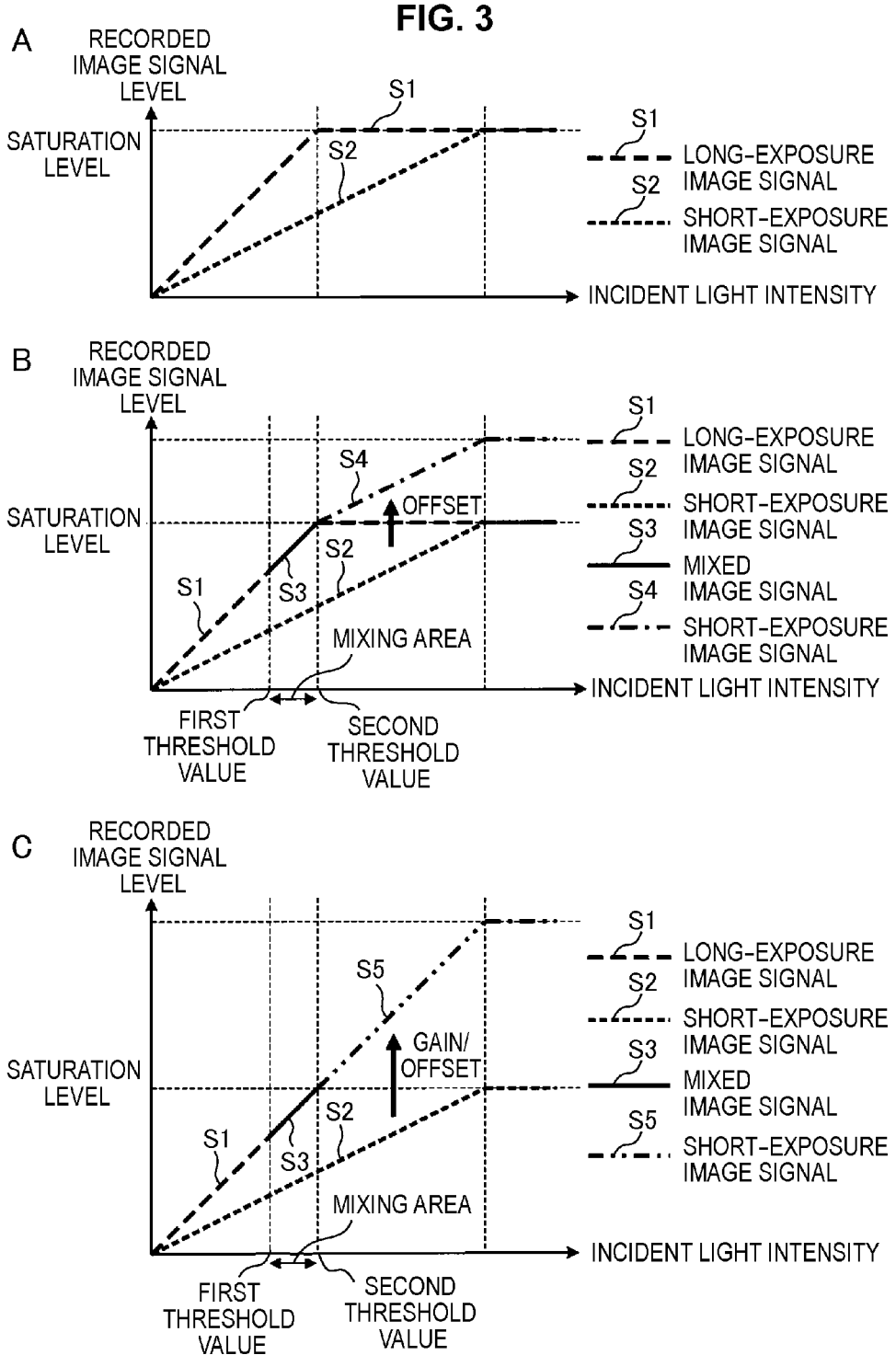
FIGS. 3A to 3C are explanatory diagrams illustrating exemplary relationships between incident light intensity and a recorded image signal level according to a first exemplary embodiment of the present disclosure.

Example of Conducting a Dynamic Range Extension Process and a Noise Removal Process Hereinafter, an exemplary configuration and exemplary operation of an imaging device 10 according to the first exemplary embodiment of the present disclosure will be described with reference to FIGS. 1 to 3. In the imaging device 10, an image signal processing method is realized by internal blocks to be discussed later working in conjunction with each other as a result of a computer executing a program.

FIG. 1 is a block diagram illustrating an exemplary internal configuration of an imaging device 10.

The imaging device 10 is equipped with a recorded image signal smoother 1, an exposure threshold corrector 2, a recorded image signal exposure information corrector 3, a mixing coefficient calculator 4, a mixing coefficient corrector 5, a mixer 6, and frame memory 7.

The recorded image signal smoother 1 reduces the effects of a noise component imposed onto a recorded image signal by smoothing a recorded image signal input into the imaging device 10. The exposure threshold corrector 2 determines whether or not to mix a smoothed recorded image signal with a mixed image signal, and also determines a resolution of the mixing coefficients, and outputs the determination result and the resolution of the mixing coefficients to the mixing coefficient calculator 4 and the mixing coefficient corrector 5. Specifically, the exposure threshold corrector 2 computes mix flag information (one example of a determination result) for a smoothed recorded image signal from a threshold value for a signal level that depends on the exposure time (incident light intensity) of a recorded image signal. In addition, the exposure threshold corrector 2 computes mixing coefficients which are used by a mixing coefficient resolution and which form a base during image mixing (hereinafter designated "base mixing coefficients").

Mix flag information refers to information that instructs the mixer 6 whether or not to conduct a mixing process (an alpha blend process, for example) on recorded image signals corresponding to the images of multiple frames. For example, when recording in a brightly lit area with a long exposure, the recorded image signal level may reach a saturation level and form an image with blown-out highlights. However, the recorded image signal level may exceed the saturation level in a short-exposure image signal that has been recorded with a short exposure and then subjected to a combined gain/offset. For this reason, the difference in the recorded image signal level is extremely large when comparing the respective recorded image signal levels of a long-exposure image signal that has reached the saturation level, and a short-exposure image signal with a combined gain/offset. At this point, if a recorded image signal that has reached the saturation level is output, the dynamic range of the mixed image signal will only reach up to the saturation level, inhibiting dynamic range extension. For this reason, there is generated flag information that instructs the mixer 6 not to mix a recorded image signal that has reached the saturation level.

Meanwhile, when recording in a dark area, the incident light intensity on the image sensor is slight, the recorded image signal level likewise stays low, and thus noise is imposed onto the recorded image signal. In order to avoid imposing such noise onto a mixed image signal, a threshold value is set for the recorded image signal level. Then, there is generated flag information that instructs the mixer 6 not to mix a recorded image signal whose recorded image signal level does not satisfy the threshold value.

Base mixing coefficients refer to information indicating the resolution of the image signal mixing ratio conducted by the mixer 6. In other words, the base mixing coefficients are computed as the values of the denominators of the mixing coefficients computed by the mixing coefficient calculator 4. For example, if the base mixing coefficient is "32", the mixing coefficient (mixing ratio) is determined to have a resolution of "1/32".

The recorded image signal exposure information corrector 3 corrects a recorded image signal on the basis of information related to different exposure times. Information related to different exposure times is differences or ratios between the exposure times of recorded image signals recorded with different exposure times. Herein, a description is given citing the example of exposure time ratios.

For example, consider the case where the exposure times of the short exposure and the long exposure have an exposure ratio of 1:2. In this case, the recorded image signal exposure information corrector 3 doubles the exposure time of the short exposure, correcting the ratio of exposure times (exposure ratio) between the short-exposure image signal and the long-exposure image signal to 2:2=1:1.

The mixing coefficient calculator 4 retrieves, as a reference signal, the mixed image signal of the previous frame from the frame memory 7, which saves a mixed image signal mixing recorded image signals recorded with different exposure times. The mixing coefficient calculator 4 then computes mixing coefficients with which to mix the corrected recorded image signal with the mixed image signal retrieved from the frame memory 7. The mixing coefficient calculator 4 also computes mixing coefficients according to information on moving subjects computed on the basis of the mixed image signal retrieved from the frame memory 7 and a recorded image signal whose exposure ratio was corrected according to the recording exposure time.

Typically, if image signals forming the images of multiple frames containing a moving subject are mixed together and blended, there is a possibility that image defects such as blur and false color may occur due to the position of the moving subject in the images. For example, in the case where a subject is moving, if the recorded image signals of consecutive frames are simply mixed together, the subject in the images may appear blurry. However, with a method conducted by an image processing device 100 of the related art, the dynamic range is extended by a frame-recursive noise removal process, and thus image defects such as the blurring of moving subjects and false color produced by image mixing may become reinforced. In addition, it is also conceivable that the minimum capacity of the frame memory may increase, and that the circuit size and power consumption may increase due to factors such as the computation of per-subject motion information and alignment processing. There is also the likelihood of reinforcing blur and false color with respect to moving subjects. For this reason, there is demand to improve the S/N ratio of moving subjects, while also improving the S/N ratio between still subjects and moving subjects.

For this reason, for a moving subject, the mixing coefficient calculator 4 outputs the area of the subject contained in the recorded image signal w as-is. Herein, the mixing coefficient calculator 4 uses motion information, exposure ratio information, the recorded image signal level, as well as the base mixing coefficients computed by the exposure threshold corrector 2 to compute a mixing coefficient (ratio) between the image signal of the previous frame and the recorded image signal with a corrected exposure ratio.

A method conducted on inter-frame differences or a method using motion vectors is suitable for the computation of motion information used by the mixing coefficient corrector 5. It is also possible to adjust the strength of noise removal by controlling the mixing coefficient using the exposure ratio information and the recorded image signal level.

The mixing coefficient corrector 5 corrects the mixing coefficients computed by the mixing coefficient calculator 4 on the basis of information related to exposure times or a threshold value for the recorded image signal level with respect to exposure time, and outputs a corrected mixing coefficient to the mixer 6. For example, the mixing coefficient corrector 5 conducts a correction process (a spatial filter process, for example) that moderates fluctuations in brightness and level among pixels with respect to a mixing coefficient (ratio) computed by the mixing coefficient calculator 4. In addition, the mixing coefficient corrector 5 corrects the mixing coefficient (ratio) using the mix flag information computed by the exposure threshold corrector 2.

The mixer 6 outputs a mixed image signal that mixes the mixed image signal retrieved from the frame memory 7 and the corrected recorded image signal on the basis of the mixing coefficient, and writes the mixed image signal to the frame memory 7. In other words, the mixer 6 conducts a mixing process on the recorded image signal with a corrected exposure ratio and the mixed image signal of the previous frame saved in the frame memory 7. The mixing of these two image signals is conducted using the mixing coefficient (ratio) MixCoef output by the mixing coefficient corrector 5. Thus, the mixer 6 is capable of mixing a recorded image signal recorded at a given exposure time with the mixed image signal of the previous frame.

Herein, the values of the respective signals involved in computation by the mixer 6 exist in the relationship expressed by the following Eq. 1.

$$\text{MixSig}(t+1) = \text{MixCoef}(t) \times \text{MixSig}(t) + (1 - \text{MixCoef}(t)) \times (\text{InSig}(t) \times \text{GAIN}(t) + \text{OFS}(t)) \quad (1)$$

InSig(t): recorded image signal at time t
MixSig(t): mixed image signal at time t
RefSig(t): reference signal at time t (mixed image signal output by frame memory 7).
Equal to mixed image signal MixSig(t−1) at time t−1.
MixCoef(t): mixing coefficient at time t (computed per pixel)
GAIN(t): exposure ratio correction gain at time t
OFS(t): exposure ratio correction offset value at time t FIG. 2 is an explanatory diagram illustrating an example of a recorded image signal.

An image sensor (not illustrated) repeatedly takes images at a first exposure time (long exposure) and a second exposure time (short exposure) that is shorter than the first exposure time, and outputs recorded image signals exposed with the different exposure times. Additionally, image signals corresponding to the images of two frames recorded with the different exposure times (the short-exposure image signal and the long-exposure image signal) are periodically input into the imaging device 10. For example, an image signal generated with the short exposure is input on the nth frame, while an image signal generated with the long exposure is input on the (n+1)th frame (where n is an integer equal to or greater than 0). The short exposure and the long exposure are alternately repeated every frame, and the image sensor (not illustrated) generates an image signal matching each exposure time, and outputs the generated image signal to the imaging device 10.

Note that the present disclosure is also applicable to image signals such as image signals recorded with three or more different exposure times, and image signals recorded with the same exposure times, irrespective of the exposure time ratios. Furthermore, although the image signal input order is described as being a short-exposure image signal and then a long-exposure image signal, the present disclosure is not limited to this order.

FIGS. 3A to 3C are explanatory diagrams illustrating exemplary relationships between incident light intensity and recorded image signal levels. FIG. 3A illustrates an example of recorded image signal levels versus incident light intensity for a long-exposure image signal S1 and a short-exposure image signal S2. FIG. 3B illustrates an example of recorded image signal levels versus incident light intensity for respective signals in the case of mixing a long-exposure image signal S1 with a short-exposure image signal S4 subjected to an offset. FIG. 3C illustrates an example of recorded image signal levels versus incident light intensity for respective signals in the case of mixing a long-exposure image signal S1 with a short-exposure image signal S4 subjected to a combined gain/offset.

In the following description, a recorded image signal recorded with a first exposure time in FIG. 3 will be called the "long-exposure image signal S1", while a recorded image signal recorded with a second exposure time will be called the "short-exposure image signal S2".

In the case of taking a long exposure as illustrated in FIG. 3A, the recorded image signal level of the long-exposure image signal S1 becomes constant at a saturation level with respect to the incident light intensity of light from a subject incident on an image sensor or the like (not illustrated) via optics (not illustrated). Meanwhile, the increase in recorded image signal level versus incident light intensity for the short-exposure image signal S2 is small compared to the increase in the recorded image signal level of the long-exposure image signal S1. For this reason, the recorded image signal level of the short-exposure image signal S2 reaches the saturation level at a later time than the long-exposure image signal S1. Note that if the saturation level is reached, the recorded image signal level becomes constant at the saturation level, even for the short-exposure image signal S2.

Next, a process that mixes the long-exposure image signal S1 and a short-exposure image signal S4 subjected to an offset will be investigated with reference to FIG. 3B.

For the sake of explanation, assume a first threshold value at a given incident light intensity, and a second threshold value, higher than the first threshold value, at an incident light intensity where the recorded image signal level of the long-exposure image signal S1 reaches the saturation level. In addition, the segment between the first and second threshold values is designated the "mixing area".

The mixer 6 offsets the level of the short-exposure image signal S2 to a level where the level of the long-exposure image signal S1 saturates with respect to the intensity of image light incident on the image sensor. Also, along with the offset process, the mixer 6 mixes the long-exposure image signal S1 and the short-exposure image signal S2 in the mixing area on the basis of mixing coefficients. As discussed above, the recorded image signal level of the short-exposure image signal S2 does not reach the saturation level until the incident light intensity reaches a fixed value. At this point, if the short-exposure image signal S2 is offset overall for incident light intensities exceeding the second threshold value, it is possible to obtain a short-exposure image signal S4 whose recorded image signal level is raised higher than the saturation level.

For this reason, if the incident light intensity increases past the second threshold value, the short-exposure image signal S2 is offset to compute the short-exposure image signal S4. In addition, the long-exposure image signal S1 and the short-exposure image signal S2 are mixed in the mixing area. This mixing process makes it possible to make the recorded image signal level continuous across the long-exposure image signal S1 and the short-exposure image signal S4, and extend the dynamic range of the recorded image signal level.

Next, a process that mixes the long-exposure image signal S1 and a short-exposure image signal S5 subjected to a combined gain/offset will be investigated with reference to FIG. 3C.

The mixer 6 applies gain to the short-exposure image signal S2, taking the gain ratio to be the same as the ratio of recorded image signal level versus the intensity at which the level of the long-exposure image signal S1 reaches a level that saturates with respect to the intensity of image light incident on the image sensor. In other words, the mixer 6 applies a combined gain/offset to the short-exposure image signal S2 overall for incident light intensities exceeding the second threshold value. This combined gain/offset is a process that offsets the short-exposure image signal S2 while raising the gain value as the incident light intensity rises past the second threshold value. For example, a combined gain/offset is applied such that the short-exposure image signal S2 changes at the same rate as the rate of change as the recorded image signal level of the long-exposure image signal S1 versus incident light intensity, yielding a short-exposure image signal S5 having a recorded image signal level raised higher than the saturation level.

In addition, the long-exposure image signal S1 and the short-exposure image signal S2 are mixed in the mixing area, similarly to the case illustrated in FIG. 3B. By subjecting the short-exposure image signal S2 to a combined gain/offset in this way, it is possible to extend the dynamic range of the post-mixing recorded image signal level. Moreover, the slope of the recorded image signal level versus incident light intensity does not change across the saturation level. For this reason, the post-mixing image is less likely to appear unnatural.

Note that the mixer 6 is able to execute either of the processes for mixing a long-exposure image signal and a short-exposure image signal illustrated in FIGS. 3B and 3C. The question of which mixing process the mixer 6 executes may be arbitrarily set according to the specifications of the imaging device 10.

According to an imaging device 10 in accordance with the first exemplary embodiment described above, a timewise IIR process is conducted over the entire dynamic range of a recorded image signal, and noise is removed by mixing timewise consecutive recorded image signals. At this point, it is simultaneously possible to conduct a dynamic range extension process on images from multiple frames by mixing recorded image signals with multiple different exposure times.

Furthermore, it is possible to output a mixed image signal every frame by mixing a mixed image signal with a recorded image signal. For this reason, the frame rate during recording is not lowered when mixing multiple recorded image signals with different exposure times. Moreover, it is possible to improve the S/N ratio of moving subjects, while also improving the S/N ratio between still subjects and moving subjects.

It is also possible to control the strength of noise removal by controlling mixing coefficients according to exposure information and the recorded image signal level. Thus, it is possible to apply control that raises the strength of noise removal from a short-exposure image signal with a poor S/N ratio, and lowers the strength of noise removal from a long-exposure image signal with a comparatively better S/N ratio. It is also possible to apply control that raises the strength of noise removal in low-illumination areas, and lowers the strength of noise removal in high-illumination areas. For this reason, it is possible to improve the S/N ratio of an image overall while extending the dynamic range.

Meanwhile, short-exposure image signals and long-exposure image signals have been mixed two frames at a time in the past. For example, referring to FIG. 2, the recorded image signals of the nth frame and (n+1)th frame are mixed, and next the recorded image signals of the (n+2)th frame and (n+3)th frame are mixed. Such a mixing process, although able to detect the motion of a subject across the nth frame and the (n+1)th frame or the (n+2)th frame and the (n+3)th frame, is unable to detect the motion of a subject across the (n+1)th frame and the (n+2)th frame. However, an imaging device 10 according to the present exemplary embodiment mixes recorded image signals while shifting one frame at a time, mixing the nth frame and the (n+1)th frame, the (n+1)th frame and the (n+2)th frame, the (n+2)th frame and the (n+3)th frame, and so on. For this reason, it is possible to reduce the difference between the recording timing at which a recorded image signal is generated and the recorded image signal of the previous frame compared to a mixing process of the related art, and to decrease misdetection of motion information for a subject across frames.

In addition, by simultaneously conducting image mixing and noise reduction processes, it is possible to reduce circuit size and power consumption, and increase computational speed. Moreover, it becomes possible to reduce the recording capacity of the frame memory 7 when generating a high dynamic range (HDR) mixed image signal with a good S/N ratio.

3. Second Exemplary Embodiment

Example of Accommodating Large Luminance Changes Across Frames

Next, an exemplary configuration and exemplary operation of an imaging device 20 according to the second exemplary embodiment of the present disclosure will be described with reference to FIG. 4.

Figure 4:
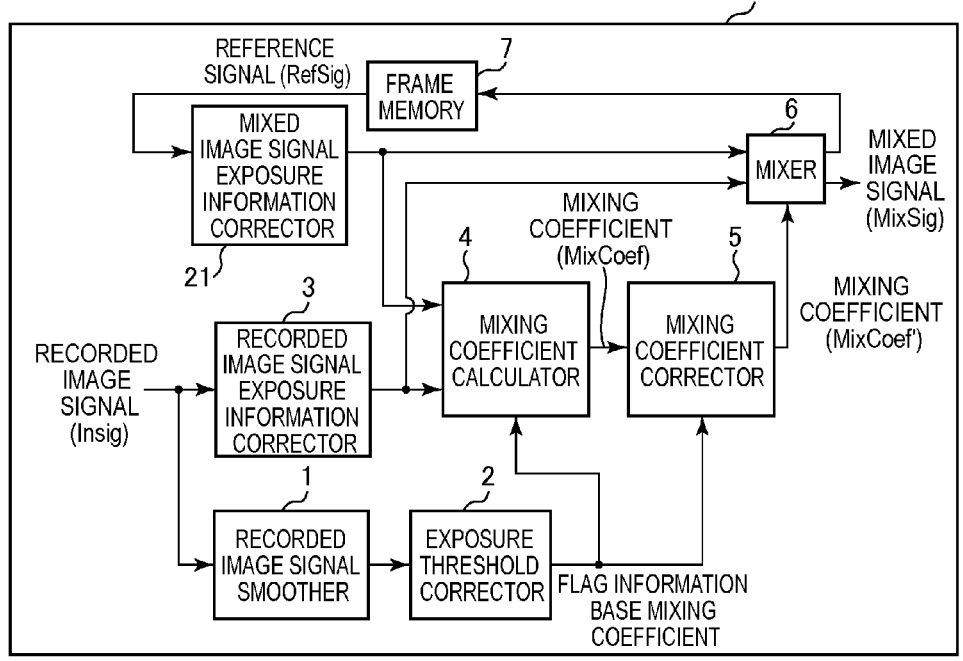
FIG. 4 is a block diagram illustrating an exemplary internal configuration of an imaging device according to a second exemplary embodiment of the present disclosure.

FIG. 4 illustrates an exemplary internal configuration of an imaging apparatus 20 according to the second exemplary embodiment.

When an imaging device 10 according to the first exemplary embodiment simultaneously realizes a dynamic range extension process and a noise removal process as discussed earlier, a large luminance change occurring across frames may result in a lower-quality mixed image signal in some cases. When a large luminance change occurs, the recorded image signal is an image signal from after the luminance change, whereas the mixed image signal of the previous frame is an image signal from before the luminance change. A luminance difference is then produced in the mixed image signal mixing these image signals. For example, the image may blink or flash on a display device input with the mixed image signal.

For this reason, in addition to the respective units provided in the imaging device 10, the imaging device 20 is equipped with a mixed image signal exposure information corrector 21 that corrects the exposure ratio of a mixed image signal. The mixed image signal exposure information corrector 21 accepts as input the mixed image signal of the previous frame retrieved from the frame memory 7. The mixed image signal exposure information corrector 21 then corrects the mixed image signal on the basis of information related to exposure time in the mixed image signal from before the luminance of the subject changes, and information related to exposure time in the recorded image signal from after the luminance of the subject changes. At this point, the mixed image signal exposure information corrector 21 conducts a correction process on the mixed image signal of the previous frame saved in the frame memory 7 according to the difference between the exposure time for the mixed image signal from before the luminance change and the exposure time of the recorded image signal from after the luminance change.

The mixer 6 conducts a mixing process using a mixed image signal that the mixed image signal exposure information corrector 21 has corrected according to the change in exposure time. Thus, it is possible to absorb the exposure ratio between the mixed image signal of the previous frame and the recorded image signal from after the luminance change. Moreover, even if a sudden luminance change occurs, it is still possible to output a mixed image signal without producing a luminance difference.

According to an imaging device 20 in accordance with the second exemplary embodiment described above, it is possible to suppress image flickering without producing a luminance difference in a mixed image signal, even in the case where a large luminance change occurs across frames. For this reason, it is possible to output a high-quality mixed image signal even in the case of simultaneously extending the dynamic range and conducting a noise removal process.

4. Third Exemplary Embodiment

Example of Reducing Bus Bandwidth and Frame Memory Capacity

Next, an exemplary configuration and exemplary operation of an imaging device 30 according to the third exemplary embodiment of the present disclosure will be described with reference to FIG. 5.

Figure 5:
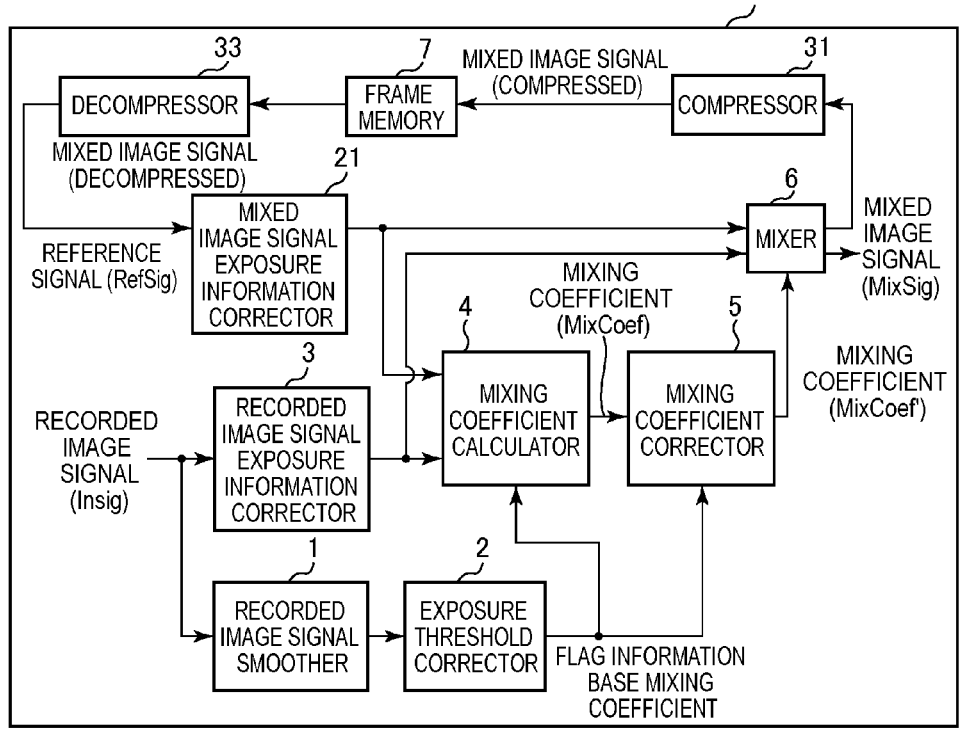
FIG. 5 is a block diagram illustrating an exemplary internal configuration of an imaging device according to a third exemplary embodiment of the present disclosure.

FIG. 5 illustrates an exemplary internal configuration of an imaging apparatus 30 according to the third exemplary embodiment.

When an imaging device 10 according to the first exemplary embodiment simultaneously realizes a dynamic range extension process and a noise removal process as discussed earlier, images from multiple frames are simultaneously retrieved from the frame memory 7, thereby straining the bus bandwidth. Insufficient recording capacity in the frame memory 7 is also conceivable.

For this reason, in addition to the respective units provided in the imaging device 20, the imaging device 30 is equipped with a compressor 31 that compresses a mixed image signal, and a decompressor 33 that decompresses a compressed mixed image signal retrieved from the frame memory 7.

The compressor 31 conducts a data compression process on a mixed image signal whose bit depth has been increased, or in other words whose dynamic range has been extended, by the mixer 6. The compressor 31 then writes a compressed mixed image signal to the frame memory 7. The compressor 31 conducts a process that compresses a mixed image signal with a data length of 14 bits to a signal with a data length of 10 bits, for example.

The decompressor 33 then retrieves a compressed mixed image signal from the frame memory 7, conducts a data decompression process, and outputs the decompressed result to the mixed image signal exposure information corrector 21. The decompressor 33 conducts a process that decompresses a mixed image signal with a data length of 10 bits to a signal with a data length of 14 bits, for example. In addition, a decompressed mixed image signal is used as a reference signal in the mixer 6.

According to an imaging device 30 in accordance with the third exemplary embodiment described above, it is possible to reduce the amount of data in the bus bandwidth from the compressor 31 to the frame memory 7, and from the frame memory 7 to the decompressor 33. Furthermore, since the frame memory 7 only saves compressed mixed image signals, it becomes possible to reduce the recording capacity of the frame memory 7.

Also, although lossless compression is desirable as the compression process conducted by the compressor 31, a lossy compression scheme may also be implemented depending on the bit precision of the mixed image signal, for example. This is because the least significant bits of a decompressed mixed image signal exert little effect even when different from the mixed image signal before compression, on the order of slightly altering the tint of an image.

5. Modifications

Note that although FIG. 3C illustrates an example of taking part of the long-exposure image signal S1 as the mixing area, the entirety of the long-exposure image signal S1 may also be taken as the mixing area. Even when setting the mixing area in this way, it is still possible to sufficiently apply an offset or a combined gain/offset.

Also, in the exemplary embodiments discussed above, flag information and base mixing coefficients are respectively input from the exposure threshold corrector 2 into the mixing coefficient calculator 4 and the mixing coefficient corrector 5. However, mixing coefficients may also be computed by inputting either flag information or base mixing coefficients into the mixing coefficient calculator 4 or the mixing coefficient corrector 5.

Additionally, it is possible to arbitrarily combine the configurations and processes of imaging devices according to the first through the third exemplary embodiments discussed above.

Note that the series of operations in the foregoing embodiments may be executed in hardware, and may also be executed in software. In the case of executing the series of operations in software, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functionality of the foregoing embodiments may also be supplied to a system or apparatus. It is furthermore obvious that the functionality is realized by a computer (or CPU or other control apparatus) in such a system or apparatus retrieving and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functionality of the foregoing embodiments may realized by a computer executing retrieved program code. In addition, some or all of the actual operations may be conducted on the basis of instructions from such program code by an OS or other software running on the computer. This also encompasses cases where the functionality of the foregoing embodiments is realized by such operations.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An imaging device including:
  a recorded image signal exposure information corrector that, on the basis of information related to different exposure times, corrects a recorded image signal recorded with the different exposure times;
  a mixing coefficient calculator that calculates a mixing coefficient used for mixing the corrected recorded image signal with a mixed image signal, in which recorded image signals recorded with the different exposure times are mixed, retrieved from a storage unit that saves the mixed image signal; and
  a mixer that outputs the mixed image signal in which the mixed image signal retrieved from the storage unit and the corrected recorded image signal are mixed on the basis of the mixing coefficients, and writes the mixed image signal to the storage unit.

(2) The imaging device according to (1), wherein
  the mixing coefficient calculator calculates the mixing coefficient according to information on a moving subject computed on the basis of the mixed image signal retrieved from the storage unit, and the corrected recorded image signal.

(3) The imaging device according to (1) or (2), further including:
  a recorded image signal smoother that smoothes the recorded image signal; and
  an exposure threshold corrector that determines a determination result indicating whether or not to mix the smoothed recorded image signal with the mixed image signal and a resolution of the mixing coefficient, and outputs the determination result and the resolution of the mixing coefficient to the mixing coefficient calculator.

(4) The imaging device according to any one of (1) to (3), further including:
a mixing coefficient corrector that corrects the mixing coefficient calculated by the mixing coefficient calculator on the basis of information related to the exposure times or a threshold value for a level of the recorded image signal with respect to the exposure times, and outputs the corrected mixing coefficients to the mixer.

(5) The imaging device according to any one of (1) to (4), wherein
the information related to the different exposure times is a difference or a ratio between exposure times of the recorded image signal recorded with the different exposure times.

(6) The imaging device according to any one of (1) to (5), wherein
the recorded image signal is repeatedly output by an image sensor with a first exposure time and a second exposure time that is shorter than the first exposure time, and
the mixer offsets a level of the recorded image signal recorded with the second exposure time up to a level at which a level of the recorded image signal recorded with the first exposure time saturates with respect to intensity of image light incident on the image sensor, and also mixes the recorded image signal recorded with the first exposure time and the recorded image signal recorded with the second exposure time on the basis of the mixing coefficient between a threshold value of first incident light intensity at which the level of the recorded image signal recorded with the first exposure time reaches the level of saturation and a threshold value of second incident light intensity lower than the first incident light intensity.

(7) The imaging device according to any one of (1) to (4), wherein
the mixer applies gain to the recorded image signal recorded with the second exposure time, taking the gain ratio to be identical to a ratio of the level of the recorded image signal versus the intensity at which the level of the recorded image signal recorded with the first exposure time reaches a level that saturates with respect to intensity of image light incident on the image sensor.

(8) The imaging device according to any one of (1) to (3), further including:
a mixed image signal exposure information corrector that corrects the mixed image signal on the basis of information related to the exposure times in the mixed image signal from before a change in subject luminance, and information related to the exposure times in the recorded image signal from after a change in subject luminance.

(9) The imaging device according to (8), further including:
a compressor that compresses and writes the mixed image signal to the storage unit; and
a decompressor that decompresses the compressed mixed image signal retrieved from the storage unit.

(10) An image signal processing method including:
correcting, on the basis of information related to different exposure times, a recorded image signal recorded with the different exposure times;
calculating a mixing coefficient used for mixing the corrected recorded image signal with a mixed image signal, in which recorded image signals recorded with the different exposure times are mixed, retrieved from a storage unit that saves the mixed image signal;
outputting the mixed image signal in which the mixed image signal retrieved from the storage unit and the corrected recorded image signal are mixed on the basis of the mixing coefficient; and
writing the mixed image signal to the storage unit.

(11) A program causing a computer to execute:
correcting, on the basis of information related to different exposure times, a recorded image signal recorded with the different exposure times;
calculating a mixing coefficient used for mixing the corrected recorded image signal with a mixed image signal, in which recorded image signals recorded with the different exposure times are mixed, retrieved from a storage unit that saves the mixed image signal;
outputting the mixed image signal in which the mixed image signal retrieved from the storage unit and the corrected recorded image signal are mixed on the basis of the mixing coefficient; and
writing the mixed image signal to the storage unit.

The present disclosure contains subject matter related to that disclosed in Japanese Priority Patent Application JP 2012-178010 filed in the Japan Patent Office on Aug. 10, 2012, the entire content of which is hereby incorporated by reference.

What is claimed is:

1. An imaging device comprising:
one or more processors configured to:
correct a recorded image signal recorded with different exposure times on the basis of information related to the different exposure times;
calculate a mixing coefficient used for mixing the corrected recorded image signal with a mixed image signal;
mix a first recorded image signal recorded with a first exposure time and a second recorded image signal recorded with a second exposure time on the basis of the mixing coefficient between a first threshold value of intensity of light incident on an imaging sensor and a second threshold value of the intensity of light incident on the imaging sensor; and
output the mixed image signal of the first recorded image signal and the second recorded image signal, and write the mixed image signal to a storage unit.

2. The imaging device according to claim 1, wherein
the one or more processors are further configured to calculate the mixing coefficient according to information on a moving subject computed on the basis of the mixed image signal retrieved from the storage unit, and the corrected recorded image signal.

3. The imaging device according to claim 2,
wherein the one or more processors are further configured to:
smooth the recorded image signal; and
determine a determination result indicating whether or not to mix the smoothed recorded image signal with the mixed image signal, determine a resolution of the mixing coefficient, and output the determination result and the resolution of the mixing coefficient.

4. The imaging device according to claim 3,
wherein the one or more processors are further configured to correct the mixing coefficient on the basis of information related to the exposure times or a threshold value for a level of the recorded image signal with respect to the exposure times, and output the corrected mixing coefficient.

5. The imaging device according to claim 4, wherein
the information related to the different exposure times is a difference or a ratio between exposure times of the recorded image signal recorded with the different exposure times.

6. The imaging device according to claim 5, wherein
the recorded image signal is repeatedly output by the imaging sensor with the first exposure time and the second exposure time that is shorter than the first exposure time, and
the one or more processors are further configured to offset a level of the second recorded image signal recorded with the second exposure time up to a level at which a level of the first recorded image signal recorded with the first exposure time saturates with respect to the intensity of light incident on the imaging sensor, the second threshold being higher than the first threshold value, and being a value at which the level of the first recorded image signal recorded with the first exposure time reaches the level of saturation.

7. The imaging device according to claim 6, wherein
the one or more processors are further configured to apply gain to the recorded image signal recorded with the second exposure time, taking a gain ratio to be identical to a ratio of the level of the recorded image signal versus the intensity at which the level of the first recorded image signal recorded with the first exposure time reaches a level that saturates with respect to the intensity of light incident on the imaging sensor.

8. The imaging device according to claim 3,
wherein the one or more processors are further configured to correct the mixed image signal on the basis of information related to the exposure times in the mixed image signal from before a change in subject luminance, and information related to the exposure times in the recorded image signal from after a change in subject luminance.

9. The imaging device according to claim 8,
wherein the one or more processors are further configured to:
compress and write the mixed image signal to the storage unit; and
decompress the compressed mixed image signal retrieved from the storage unit.

10. An image signal processing method comprising:
correcting, on the basis of information related to different exposure times, a recorded image signal recorded with the different exposure times;
calculating a mixing coefficient used for mixing the corrected recorded image signal with a mixed image signal;
mix a first recorded image signal recorded with a first exposure time and a second recorded image signal recorded with a second exposure time on the basis of the mixing coefficient between a first threshold value of intensity of light incident on an imaging sensor and a second threshold value of the intensity of light incident on the imaging sensor;
outputting the mixed image signal of the first recorded image signal and the second recorded image signal; and
writing the mixed image signal to a storage unit.

11. A non-transitory computer readable recording medium having thereon a set of instructions which when executed by a computer causes the computer to execute:
correcting, on the basis of information related to different exposure times, a recorded image signal recorded with the different exposure times;
calculating a mixing coefficient used for mixing the corrected recorded image signal with a mixed image signal;
mix a first recorded image signal recorded with a first exposure time and a second recorded image signal recorded with a second exposure time on the basis of the mixing coefficient between a first threshold value of intensity of light incident on an imaging sensor and a second threshold value of the intensity of light incident on the imaging sensor;
outputting the mixed image signal of the first recorded image signal and the second recorded image signal; and
writing the mixed image signal to a storage unit.

12. An imaging device comprising:
one or more processors configured to:
correct a recorded image signal recorded with different exposure times on the basis of information related to the different exposure times, wherein the information related to the different exposure times is a difference or a ratio between exposure times of the recorded image signal recorded with the different exposure times, wherein the recorded image signal is repeatedly output with a first exposure time and a second exposure time that is shorter than the first exposure time;
smooth the recorded image signal;
determine a determination result indicating whether or not to mix the smoothed recorded image signal with the mixed image signal, determine a resolution of the mixing coefficient, and output the determination result and the resolution of the mixing coefficient;
calculate a mixing coefficient used for mixing the corrected recorded image signal with a mixed image signal, wherein the mixing coefficient is calculated according to information on a moving subject computed on the basis of the mixed image signal and the corrected recorded image signal;
correct the mixing coefficient on the basis of information related to the exposure times or a threshold value for a level of the recorded image signal with respect to the exposure times, and output the corrected mixing coefficient;
offset a level of the recorded image signal recorded with the second exposure time up to a level at which a level of the recorded image signal recorded with the first exposure time saturates with respect to intensity of image light incident on an image sensor, mix the recorded image signal recorded with the first exposure time and the recorded image signal recorded with the second exposure time on the basis of the mixing coefficient between a first threshold value of incident light intensity and a second threshold value of incident light intensity, the second threshold being higher than the first threshold value, and being a value at which the level of the recorded image signal recorded with the first exposure time reaches the level of saturation; and
output the mixed image signal in which the mixed image signal and the corrected recorded image signal are mixed on the basis of the mixing coefficient, and write the mixed image signal to a storage unit.

* * * * *